US008529071B2

(12) United States Patent
Grasser

(10) Patent No.: US 8,529,071 B2
(45) Date of Patent: Sep. 10, 2013

(54) ILLUMINATING SPATIAL LIGHT MODULATORS USING AN ANAMORPHIC PRISM ASSEMBLY

(75) Inventor: Regis Grasser, Orleans (FR)

(73) Assignee: Texas Instruments Incorporated, Dallas, TX (US)

( * ) Notice: Subject to any disclaimer, the term of this patent is extended or adjusted under 35 U.S.C. 154(b) by 692 days.

(21) Appl. No.: 12/353,672

(22) Filed: Jan. 14, 2009

(65) Prior Publication Data

US 2009/0185144 A1   Jul. 23, 2009

Related U.S. Application Data

(60) Provisional application No. 61/021,291, filed on Jan. 15, 2008.

(51) Int. Cl.
  *G02B 13/10* (2006.01)

(52) U.S. Cl.
  USPC .................................. 353/81; 359/291

(58) Field of Classification Search
  USPC ................................. 353/81, 31; 359/291, 669
  See application file for complete search history.

(56) References Cited

U.S. PATENT DOCUMENTS

| 5,796,526 A | 8/1998 | Anderson |
| 6,547,399 B2 * | 4/2003 | Knox ............................... 353/31 |
| 6,719,429 B2 | 4/2004 | Peterson |
| 7,185,991 B2 | 3/2007 | Akiyama |

* cited by examiner

*Primary Examiner* — Seung C Sohn
(74) *Attorney, Agent, or Firm* — Charles A. Brill; Wade J. Brady, III; Frederick J. Telecky, Jr.

(57) ABSTRACT

According to particular embodiments, an illumination system includes a light source that generates light for use in illuminating a spatial light modulator and an assembly of two optical elements spatially separated by a gap that receives the light from the light source, changes the shape of the light, and transmits the light onto the spatial light modulator.

26 Claims, 3 Drawing Sheets

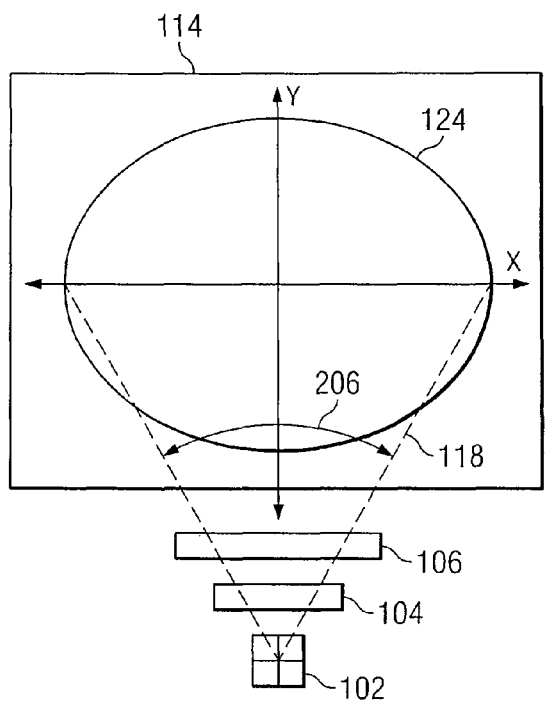
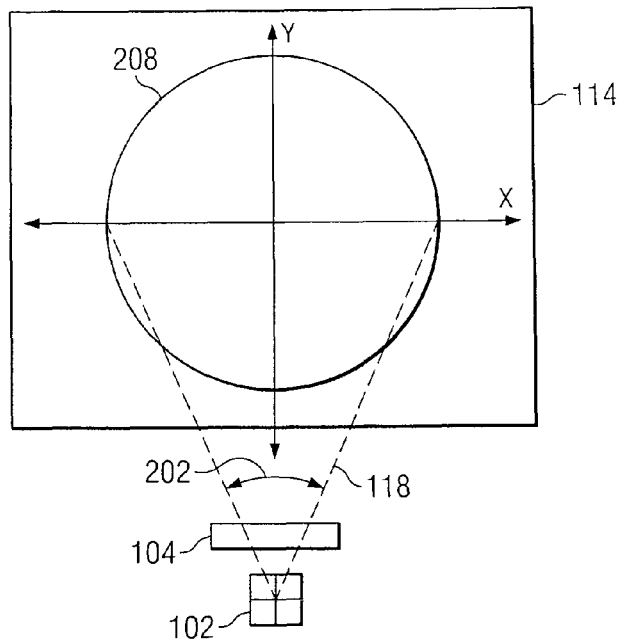
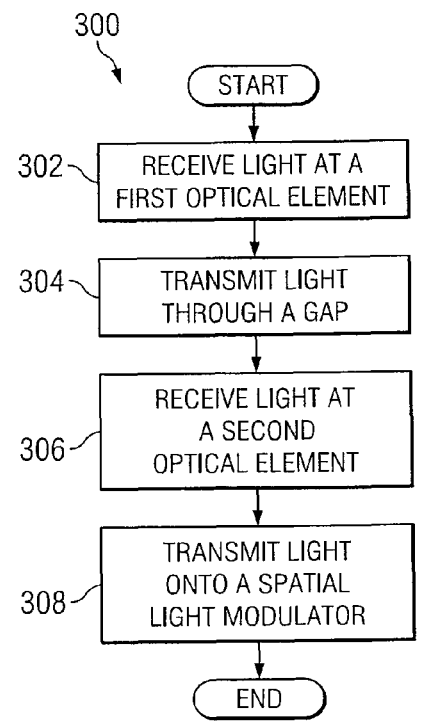
FIG. 2A
FIG. 2B
FIG. 3

ILLUMINATING SPATIAL LIGHT MODULATORS USING AN ANAMORPHIC PRISM ASSEMBLY

RELATED APPLICATION

This application claims benefit under 35 U.S.C. §119(e) of U.S. Provisional Application Ser. No. 61/021,291, entitled "TIR PRISM WITH ANAMORPHIC FEATURE,", filed Jan. 15, 2008, by Regis Grasser.

TECHNICAL FIELD

This disclosure relates generally to illumination and display systems having spatial light modulators and, more particularly, to illumination systems and methods using an anamorphic prism assembly.

BACKGROUND

Typical image projection or display systems include one or more light sources, illumination elements, one or more spatial light modulators, and projection elements. Light sources may include any suitable light source, such as, for example, a metal halide lamp, a xenon arc lamp, a light emitter diode (LED), a laser, etc. The illumination elements collect light from the light sources and direct the light onto the spatial light modulators, the spatial light modulators use the light to create images, and the projection elements magnify and project the images. The brightness of the image affects the quality of the image. To improve brightness, it is important to minimize any loss of light between the light source and the spatial light modulator and to maximize the amount of surface area of the spatial light modulator that the light illuminates.

Spatial light modulators represent devices that may be used in a variety of optical communication and/or video display systems. In some applications, spatial light modulators may generate an image by controlling a plurality of individual elements that control light to form the various pixels of the image. One example of a spatial light modulator is a deformable micromirror device ("DMD"), sometimes known as a digital micromirror device.

SUMMARY

According to one embodiment, an illumination system includes a spatial light modulator operable to direct an image from the spatial light modulator to a projection lens, a light source operable to generate light having a first shape for use in illuminating the spatial light modulator, and an assembly of at least two optical elements coupled between the light source and the spatial light modulator. The assembly includes first and second optical elements spatially separated by a gap such that an exit surface of the first optical element and an entry surface of the second optical element form a non-zero angle. The assembly is operable to modify the light to a second shape different from the first shape and transmit the modified light onto the spatial light modulator.

According to another embodiment, a method includes receiving light having a first shape at an assembly of at least two optical elements. The assembly includes first and second optical elements spatially separated by a gap such that an exit surface of the first optical element and an entry surface of the second optical element form a non-zero angle. The method also includes modifying the received light to a second shape different from the first shape and transmitting the modified light onto a spatial light modulator.

Certain embodiments may provide one or more technical advantages. A technical advantage of one embodiment may be the ability to provide a greater collection angle for light collected onto a spatial light modulator from a light source. Another technical advantage of one embodiment may be the ability to provide a brighter image generated by a spatial light modulator.

Other technical advantages of the present disclosure may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of embodiments of the present disclosure and its advantages, reference is made to the following description, taken in conjunction with the accompanying drawings, in which:

FIGS. 2A and 2B illustrate illumination provided by the example system of FIGS. 1A and 1B that is collected onto a spatial light modulator; and FIG. 3 is a flowchart that illustrates a method for illumination of a spatial light modulator.

DETAILED DESCRIPTION OF EXAMPLE EMBODIMENTS

In a display system using a spatial light modulator, it is often advantageous for a light source to have the same aspect ratio as the spatial light modulator. For example, where the light source has a square shape, it is advantageous for the spatial light modulator to have a square shape and disadvantageous for the spatial light modulator to have a rectangular shape. In particular, a mismatch between the shape of the light source and the shape of the spatial light modulator may lead to loss of light between the light source and the spatial light modulator. However, common light sources often have a square shape while common spatial light modulators often have a rectangular shape.

In accordance with the teachings of the present disclosure, a method and system are provided that illuminate spatial light modulators and reduce light loss between light sources and spatial light modulators having different aspect ratios. The method and system may use any of a variety of spatial light modulators, including, for example, deformable micromirror devices. An example of one deformable micromirror device is a digital micromirror device (DMD™) made by Texas Instruments, Inc.

Embodiments of the present disclosure are best understood by referring to FIGS. 1 through 3 of the drawings, like numerals being used for corresponding parts of the various drawings.

Figure 1A:
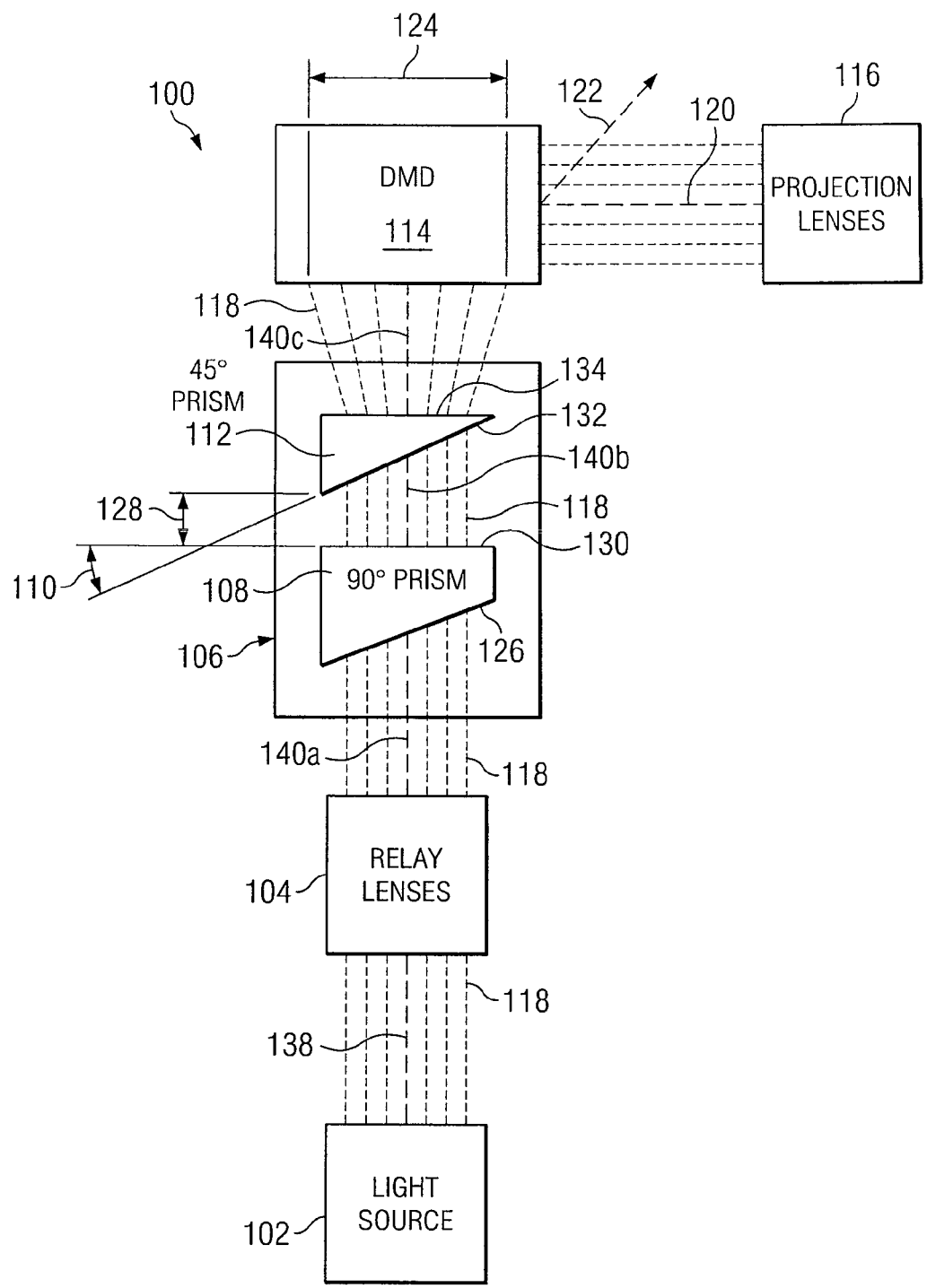
FIGS. 1A and 1B illustrate example portions of an illumination system, in accordance with various embodiments of the present disclosure.
Figure 1B:
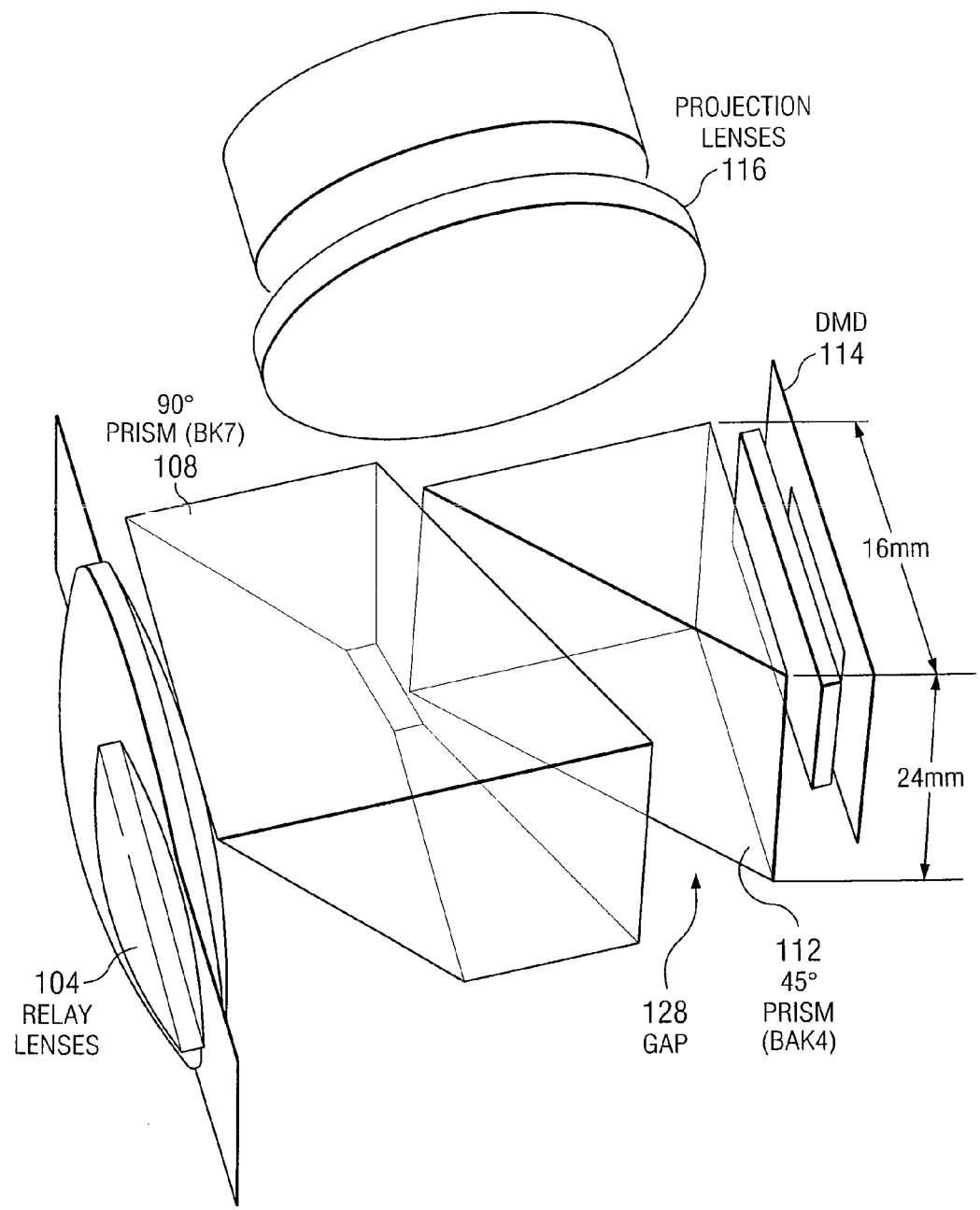

FIGS. 1A and 1B illustrate a portion of an illumination system 100 having a light source 102 coupled to projection lenses 116 through relay lenses 104, optical elements 106, and a spatial light modulator 114, which in this example is a DMD. FIG. 1A is a two-dimensional block diagram, and FIG. 1B is a three-dimensional schematic of illumination system 100. Light 118 emitted by light source 102 travels from light source 102 through relay lenses 104 along a light path 138. Light 118 travels from relay lenses 104 through optical elements 106 along a light path 140 to spatial light modulator 114. Optical elements 106 modify light 118 by distorting its shape in one dimension. Spatial light modulator 114 directs light 118 along a light path 120 to projection lenses 116 that project light 118 onto an image plane to produce an image for display.

Light source 102 (FIG. 1A) generally refers to any suitable light source, such as, for example, a metal halide lamp, a xenon arc lamp, a light emitter diode (LED), a laser, etc. In particular embodiments, light 118 may be colored light. In the example embodiment, light 118 emitted by light source 102 along light path 138 is capable of being focused onto one or more spatial light modulators 114 by one or more relay lenses 104 and optical elements 106 along light path 140.

As illustrated, relay lenses 104 are positioned between light source 102 and spatial light modulator 114. In particular embodiments, relay lenses 104 may be positioned between light source 102 and optical elements 106. Relay lenses 104 generally refer to any assembly of one or more prisms, lenses, and other optical elements that are capable of focusing light 118 onto one or more spatial light modulators 114. In the example embodiment, relay lenses 104 receive light 118 from light source 102 and transmit light onto spatial light modulator 114 via optical elements 106.

As illustrated, optical elements 106 are positioned between light source 102 and spatial light modulator 114. Optical elements 106 generally refer to an assembly of one or more prisms, lenses, and other optical elements that are capable of changing the shape of light 118. According to particular embodiments, optical elements 106 may comprise two prisms, such as a front optical element 108 and a rear optical element 112, separated by a gap 128 of space. Front optical element 108 may be any prism, lens, or other optical element capable of directing light in a desired direction. For example, front optical element 108 may be a right angle TIR prism, such as a BK7 prism. Rear optical element 112 may be any prism, lens, or other optical element. In particular embodiments, rear optical element 108 may be a TIR prism. For example, rear optical element 108 may be a 45 degree TIR prism, such as a BAK4 prism. As illustrated, gap 128 is wedge-shaped and represents the space between front and rear optical elements 108 and 112.

In operation, front optical element 108 receives light 118 transmitted along a light path 140a at an entrance surface 126 of front optical element 108 and transmits light 118 along a light path 140b from an exit surface 130 of front optical element 108 to an entrance surface 132 of rear optical element 112. Rear optical element 112 receives light 118 transmitted along light path 140b at its entrance surface 132 and transmits light 118 along a light path 140c from an exit surface 134 of rear optical element 108 onto a collection area 124 of spatial light modulator 114. (See FIG. 2B for a more detailed illustration of collection area 124). Collection area 124 represents the portion of the surface area of spatial light modulator 114 that light 118 encompasses such that spatial light modulator 114 may collect illumination from that area.

In general, when a square light source 102 is used with a rectangular spatial light modulator 114, light 118 from light source 102 does not effectively illuminate spatial light modulator 114. In particular, there exists an undesirable amount of the surface area of the spatial light modulator 114 that cannot be directly matched to the square light source and is therefore wasted. However, by implementing the assembly of optical elements 106, light 118 from square light source 102 may more effectively illuminate spatial light modulator 114. Specifically, optical elements 106 change the shape of light 118 by magnifying light 118 in a desired direction (in this embodiment, the horizontal direction). The collection area 124 for collecting light on spatial light modulator 114 is thereby increased. This increased area for collection of light 118 translates to a larger amount of light 118 that is collected. When more light is collected from collection area 124 of spatial light modulator 114, more light may be reflected from spatial light modulator 114. The assembly of optical elements 106 that is capable of changing the shape of light 118 enables system 100 to achieve a brighter image display than an illumination system without an assembly of optical elements 106.

In particular embodiments, the assembly of optical elements 106 changes the shape of light 118 by generating optical power, thereby creating an anamorphic effect. An anamorphic effect is created by optical elements that produce optical power according to their relative orientation. For example, the anamorphic effect of the assembly of optical elements 106 may be adjusted by varying gap angle 110. Gap angle 110 represents the angle at which the entry surface 132 of rear optical element 112 is positioned relative to the exit surface 130 of front optical element 108. Gap angle 110 may be any angle between zero and ninety degrees. For example, gap angle 110 may be an angle within the range of one to forty-five degrees. In the example embodiment, gap angle 110 is twenty-four degrees.

Spatial light modulator 114 generally refers to any device capable of varying the intensity of received light beams by selectively transmittinq, absorbing, or diffracting at least some of the received light beams in response to an electronic control signal. In operation, spatial light modulator 114 spatially modulates light 118, thereby producing an image that may be projected by one or more projection lenses. In the example embodiment, spatial light modulator 114 comprises a DMD (digital micromirror device). However, any suitable spatial light modulator may be used, such as a liquid crystal on silicon (LCOS), a liquid crystal display (LCD), an interferometric modulator, an analog MEMS device, or an acoustooptic cell.

A DMD is an electromechanical device comprising an array of hundreds of thousands of tilting mirrors. In operation, each mirror may tilt, for example, plus or minus ten degrees to achieve an "on" state or "off" state. To permit the mirrors to tilt, each mirror is mounted onto support posts by one or more hinges and separated from underlying control circuitry by an air gap. The control circuitry provides electrostatic forces based at least in part on image data received from a controller (not explicitly shown). The electrostatic forces cause a mirror to tilt "on" or "off." Light 118 is reflected by the "on" mirrors along light path 120 for receipt by projection lenses 116 and by the "off" mirrors along light path 122 for receipt by a light absorber (not explicitly shown). The pattern of "on" versus "off" mirrors modulates the intensity of light 118.

As shown in the example of FIGS. 1A and 1B, illumination system 100 utilizes one spatial light modulator 114. However, it should be recognized that the teachings of the present disclosure may be applied to illumination systems that include additional spatial light modulators.

Projection lenses 116 generally refer to one or more prisms, lenses, and other optical elements operable to transmit light in a manner that concentrates, diverges, refracts, diffracts, redirects, reshapes, integrates, and/or reflects the light. In the illustrated example, projection lenses 116 receive light 118 from light source 102 via relay lenses 104, optical elements 106, and spatial light modulator 114, and project light 118 onto an image plane.

FIGS. 2A, 2B, and 3 illustrate additional details of example embodiments shown in FIGS. 1A and 1B. The description below referring to FIGS. 2A and 2B further describes the collection of light 118 onto spatial light modulator 114. The description below referring to FIG. 3 describes an example method for illuminating spatial light modulator 114.

FIGS. 2A and 2B illustrate example illumination from light source 102 that is directed onto spatial light modulator 114 by relay lenses 104 and is available for collection by spatial light modulator 114 according to one embodiment of the present disclosure. Collection area 208 (FIG. 2A) and collection area 124 (FIG. 2B) correspond to the area of light 118 that may be directed onto and collected by spatial light modulator 114 at one or more collection angles (such as collection angle 202 in FIG. 2A and collection angle 206 in FIG. 2B) relative to light source 102. FIG. 2B also shows optical elements 106 of system 100.

FIG. 2A illustrates example illumination provided by an illumination system that does not include optical elements that change the shape of light, such as the assembly of optical elements 106 shown in FIGS. 1A and 1B. Collection area 208 (FIG. 2A) illustrates an example collection area of light 118 that may be directed onto spatial light modulator 114 by relay lenses 104, without first passing through an assembly of optical elements 106. FIG. 2A shows a collection area 208 having a generally circular shape. For example, collection area 208 illustrates the collection area that would be available using an illumination system that includes a classic Rare Total Internal Reflection (RTIR) prism assembly but does not include any optical elements that change the shape of light 118.

FIG. 2B illustrates example illumination provided by the example system of FIGS. 1A and 1B. Collection area 124 (FIG. 2B) illustrates an example collection area of light 118 that may be directed onto spatial light modulator 114 by an assembly of optical elements 106. FIG. 2B shows a collection area 208 having a generally elliptical shape. Collection area 124 (FIG. 2B) is larger than collection area 208 (FIG. 2A) in the horizontal direction (along the x-axis). As illustrated, the assembly of optical elements 106 increases the collection area of light 118 that may be collected by spatial light modulator 114 by magnifying the shape of light 118 in the horizontal direction (along the x-axis). In this illustrated embodiment, the assembly of optical elements 106 also increases the collection angle for light 118 in the horizontal direction.

Collection angle 202 (FIG. 2A) measures the maximum angle from which light 118 may be collected by spatial light modulator 114. Collection angle 206 (FIG. 2B) measures the maximum angle in the x direction from which light 118 may be collected by spatial light modulator 114. In general, a collection angle is the maximum angle from which light may be collected in any illumination system. According to particular embodiments, collection angles 202 and 206 may be within the range of 1-180 degrees. In the example embodiment, collection angle 202 is 48 degrees, collection angle 206 is 90 degrees, and the collection angle in the vertical direction (along the y-axis) for FIG. 2B (not shown) remains unchanged at 48 degrees.

As illustrated, by implementing the assembly of optical elements 106 to change the shape of light 118 in the horizontal direction (FIG. 2B) and transmit light 118 onto spatial light modulator 114, the collection angle in the vertical direction remains at 48 degrees and the collection angle in the horizontal direction (collection angle 206 in the x-direction) changes to 90 degrees. This example illustrates that light may be effectively coupled from light source 102 onto spatial light modulator 114 even where light source 102 and spatial light modulator 114 do not have the same aspect ratio.

Particular examples specified throughout this document are intended for example purposes only, and are not intended to limit the scope of the present disclosure. In particular, this document is not intended to be limited to a particular spatial light modulator, such as a DMD. Moreover, the illustrations in the FIGURES are not necessarily drawn to scale.

FIG. 3 is a flowchart illustrating a method, indicated generally at 300, for illuminating a spatial light modulator in accordance with various embodiments of the present disclosure. As illustrated, method 300 shows the steps involved for the assembly of optical elements 106 to change the shape of the light 118 and transmit light 118 onto spatial light modulator 114.

According to particular embodiments, in step 302, the assembly of optical elements 106 receives light 118 at front optical element 108. In step 304, front optical element 108 transmits light 118 from its exit surface 130 through gap 128 to entry surface 132 of rear optical element 112. In step 306, rear optical element 112 receives light 118 at its entry surface 132. In step 308, rear optical element 112 transmits light 118 onto spatial light modulator 114.

In some embodiments, method 300 may also include determining gap angle 110 according to the aspect ratios of light source 102 and spatial light modulator 114. For example, such a determination may include determining whether the aspect ratios of light source 102 and spatial light modulator 114 differ, and, if they differ, determining a dimension in which modification of light 118 is desired and an extent to which modification of light 118 is desired to effectively illuminate spatial light modulator 114 and minimize any loss of light. The determination of gap angle 110 may also include adjusting the relative positioning of the front and rear optical elements to achieve the desired modification of light 118 according to the determined dimension and the determined extent of modification.

The method described with respect to FIG. 3 is merely illustrative. The manner of operation and elements indicated as performing the operations may be modified in any appropriate manner. While the method describes particular steps performed in a specific order, system 10 contemplates any suitable collection and arrangement of elements performing some, all, or none of these steps in any operable order.

Although the present disclosure describes particular embodiments and suggests numerous alternative embodiments to one skilled in the art, the present disclosure encompasses all embodiments and all alternative embodiments within the scope of the appended claims.

What is claimed is:

1. An illumination system, comprising:
a deformable micromirror device operable to direct an image to a projection lens;
a light emitting diode operable to generate a light beam having a substantially circular cross section for use in illuminating the deformable micromirror device; and
an assembly of at least two optical elements coupled between the light emitting diode and the deformable micromirror device, the assembly comprising first and second optical elements spatially separated by a gap such that an exit surface of the first optical element and an entry surface of the second optical element form a non-zero angle, wherein the assembly is operable to anamorphically modify the light beam passing through the first optical element and the second optical element to the deformable micromirror device.

2. The system of claim 1, wherein the non-zero angle is in the range of one to forty-five degrees.

3. The system of claim 1, wherein the non-zero angle is twenty-four degrees.

4. The system of claim 1, wherein the second optical element is a total internal reflection prism.

5. The system of claim 1, further comprising a relay lens, the relay lens positioned to collect the light beam from the light emitting diode and direct the light beam to the first optical element.

6. The system of claim 1, wherein the projection lens is positioned to receive an image from the deformable micromirror device and direct the image to an image plane.

7. An illumination system, comprising:
   a spatial light modulator operable to direct an image to a projection lens;
   a light source operable to generate a light beam having a first cross section for use in illuminating the spatial light modulator; and
   an assembly of at least two optical elements coupled between the light source and the spatial light modulator, the assembly comprising first and second optical elements spatially separated by a gap such that an exit surface of the first optical element and an entry surface of the second optical element form a non-zero angle, wherein the assembly is operable to modify the light beam to a second cross section different from the first cross section and transmit the modified light beam onto the spatial light modulator.

8. The system of claim 7, wherein the non-zero angle is in the range of one to forty-five degrees.

9. The system of claim 7, wherein the non-zero angle is twenty-four degrees.

10. The system of claim 7, wherein the second optical element is a total internal reflection prism.

11. The system of claim 7, wherein modifying the light beam comprises magnifying the light beam in one direction.

12. The system of claim 7, further comprising a relay lens, the relay lens positioned to collect the light beam from the light source and direct the light beam to the first optical element.

13. The system of claim 7, wherein the projection lens is positioned to receive an image from the spatial light modulator and direct the image to an image plane.

14. The system of claim 7, wherein the spatial light modulator is selected from a group consisting of:
   a deformable micromirror device;
   a liquid crystal device;
   a liquid crystal on silicon device;
   an interferometic modulator;
   an analog MEMS device; and
   an acoustooptic cell.

15. The system of claim 7, wherein the light source is a light emitting diode.

16. A method for changing the cross section of a light beam comprising:
   receiving a light beam having a first cross section at an assembly of at least two optical elements, the assembly comprising first and second optical elements spatially separated by a gap such that an exit surface of the first optical element and an entry surface of the second optical element form a non-zero angle;
   modifying the received light beam to a second cross section different from the first cross section; and
   transmitting the modified light beam onto a spatial light modulator.

17. The method of claim 16, further comprising determining the non-zero angle according to the size and shape of the spatial light modulator.

18. The method of claim 16, wherein the non-zero angle is in the range of one to forty-five degrees.

19. The method of claim 16, wherein the second optical element is a total internal reflection prism.

20. The method of claim 16, wherein modifying the received light beam comprises magnifying the light beam in one direction.

21. The illumination system of claim 1, the assembly operable to modify the light beam due to a difference in path length across an optical path between the first optical element and the second optical element.

22. The illumination system of claim 7, the assembly operable to modify the light beam to a second cross section different from the first cross section due to a difference in path length across an optical path between the first optical element and the second optical element.

23. The method of claim 16, the modifying due to a difference in path length across an optical path between the first optical element and the second optical element.

24. The system of claim 1, wherein the non-zero angle is at least one degree.

25. The system of claim 7, wherein the non-zero angle is at least one degree.

26. The method of claim 16, wherein the non-zero angle is at least one degree.

* * * * *